(12) United States Patent
Aull et al.

(10) Patent No.: US 7,934,102 B2
(45) Date of Patent: Apr. 26, 2011

(54) METHOD AND SYSTEM FOR EFFICIENT EXCEPTION HANDLING OF THE PRODUCTION PROCESS OF PERSONAL IDENTIFICATION VERIFICATION (PIV) SMARTCARDS

(75) Inventors: Kenneth Wagner Aull, Fairfax, VA (US); Erik J. Bowman, McLean, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1195 days.

(21) Appl. No.: 11/362,207

(22) Filed: Feb. 27, 2006

(65) Prior Publication Data

US 2007/0074041 A1    Mar. 29, 2007

Related U.S. Application Data

(60) Provisional application No. 60/664,949, filed on Mar. 25, 2005.

(51) Int. Cl.
*G06F 21/00* (2006.01)
(52) U.S. Cl. ............. 713/186; 380/44; 380/45; 380/46; 380/47; 726/9

(58) Field of Classification Search .................. 713/186
See application file for complete search history.

(56) References Cited

U.S. PATENT DOCUMENTS

| | | | | |
|---|---|---|---|---|
| 5,467,403 A | * | 11/1995 | Fishbine et al. | 382/116 |
| 6,035,398 A | * | 3/2000 | Bjorn | 713/186 |
| 6,763,468 B2 | * | 7/2004 | Gupta et al. | 726/2 |
| 2002/0080190 A1 | * | 6/2002 | Hamann et al. | 345/810 |
| 2004/0059953 A1 | * | 3/2004 | Purnell | 713/202 |
| 2004/0172364 A1 | * | 9/2004 | Murray et al. | 705/50 |
| 2005/0146417 A1 | * | 7/2005 | Sweatte | 340/5.2 |

* cited by examiner

*Primary Examiner* — Vivek Srivastava
*Assistant Examiner* — Thong Truong
(74) *Attorney, Agent, or Firm* — Andrews Kurth LLP

(57) ABSTRACT

A method and system provide efficient exception handling of the production process of PIV smartcards. Specifically, an automatic personal identity verification (AutoPIV) system and process manage potential failures in identification for agencies, such as a breakdown in correct identification. The AutoPIV system and process may deny access to individuals falsely claiming to be someone with legitimate access rights. The AutoPIV system and process may also accurately identify those with legitimate access rights.

23 Claims, 4 Drawing Sheets

METHOD AND SYSTEM FOR EFFICIENT EXCEPTION HANDLING OF THE PRODUCTION PROCESS OF PERSONAL IDENTIFICATION VERIFICATION (PIV) SMARTCARDS

RELATED APPLICATION

This application claims the benefit of U.S. Provisional Application, Ser. No. 60/664,949, entitled "Method and System for Efficient Exception Handling for the Process of the Production Process of Personal Identification Verification (PIV) Smartcards," filed on Mar. 25, 2005.

TECHNICAL FIELD

The technical field relates to personal identification verification (PIV) systems and processes, and, in particular, to a method and system for efficient exception handling of the production process of PIV smartcards.

BACKGROUND

The Homeland Security Presidential Directive 12 (HSPD-12) required the National Institute of Standards and Technology (NIST) to issue a Federal Information Processing Standard (FIPS-201) for secure and reliable forms of identification. The FIPS-201 standard, entitled Personal Identity Verification (PIV) for Federal Employees and Contractors, specifies the architecture and technical requirements for a common identification standard, including components, interfaces, support services, and life cycle management functions. The FIPS-201 standard also supports interoperability among identification cards, electronic card readers, communications systems, and access control system interfaces.

The FIPS-201 standard indicates that federal policy is to issue smartcards for both logical and physical access to federal spaces, without waiver, for all federal agencies and their contractors. The Office of Management and Budget (OMB) requires implementation plans for each agency, with required personnel vetting processes and procedures. OMB also requires that PIV smartcards replace all new or refreshed identification (ID) cards, with all physical access systems to be updated.

The FIPS-201 standard includes requirements to be met before issuing smartcards and requirements for the smartcards' use. However, the FIPS-201 standard does not specify the actual mechanical process of issuing these smartcards or their distribution. The FIPS-201 requirements have opened up the potential to make improvements in process performance over current smartcard issuing methodologies.

Potential failures and a breakdown in correct identification can have serious consequences for an organization. Currently smartcards and other identification methods are used for identity verification purposes. Many smartcards, driver's licenses, credit cards and other tokens are issued centrally to provide a wide range of verification. But with current systems, a centrally issued smartcard system cannot deliver a smartcard to one and only one person in an economic fashion. The hidden cost of the current systems is decentralized printing (issuance at every facility) of non-reputable smartcards. The cost includes equipments, maintenance, security, and compromises. PIV smartcard printing now requires one or more anti-counterfeiting measures, such as holograms. The strength of these measures is directly related to the expense of the printer. If the printer is inexpensive, thus widely available and affordable, anti-counterfeiting measures may fail.

Standard-based non-reputable smartcards may depend on a personal identification number (PIN) to release keys on the PIV smartcard. Only the person represented by the PIV smartcard is allowed to know the PIN. Current systems set the PIN during the issuance process in order to tie a "Hired Applicant" to the PIV smartcard. Typically, the person to whom the card is being issued is required to enter it themselves in real-time during the production of the smartcard. This process may comprise security of the PIV smartcard.

Private key infrastructures (PKIs) are used to sign certificates. However, current PKIs do not have an economical process for certificate renewal. The current approach conducts the original issuance process again, which is costly and time consuming.

SUMMARY

A method for efficient exception handling of the production process of personal identification verification (PIV) smartcards includes checking a legend submitted by an applicant, collecting source identity documents and biometrics of the applicant, and checking the biometrics by conducting a criminal background check on the applicant. The method further includes inputting the legend, the source identity documents, the biometrics, and security and clearance approvals into an identity management (IDM) system, printing and issuing a PIV smartcard, and locking the PIV smartcard. The PIV smartcard is locked after issuance. The method further includes verifying the applicant's authenticity upon receiving the applicant's request for access to security systems and granting the applicant physical and logical access to the security systems by unlocking the PIV smartcard.

A system for efficient exception handling of the production process of PIV smartcards includes a central security clearance that checks biometrics of an applicant requesting access to security systems. The central security clearance checks the biometrics of the applicant by conducting a criminal background check on the applicant. The system further includes an identity management (IDM) system. The IDM system collects a legend of an applicant from a PIV sponsor and collects source identity documents and the biometrics of the applicant from a PIV registrar. The IDM communicates with the central security clearance to obtain security and clearance approvals regarding the applicant. The system further includes a network connecting the central security clearance and the IDM system. The IDM system issues a PIV smartcard for the applicant after obtaining the security and clearance approvals from the central security clearance. The PIV smartcard is locked after issuance. The IDM system, after verifying the applicant's authenticity at a registration station, grants the applicant physical and logical access to the security systems by unlocking the PIV smartcard. The IDM system communicates with the registration station using the network.

A computer readable medium provides instructions for efficient exception handling of the production process of PIV smartcards. The instructions include checking a legend submitted by an applicant, collecting source identity documents and biometrics of the applicant, and checking the biometrics by conducting a criminal background check on the applicant. The instructions further include inputting the legend, the source identity documents, the biometrics, and security and clearance approvals into an identity management (IDM) system, printing and issuing a PIV smartcard, and locking the PIV smartcard. The PIV smartcard is locked after issuance. The instructions further include verifying the applicant's authenticity upon receiving the applicant's request for access to security systems and granting the applicant physical and logical access to the security systems by unlocking the PIV smartcard.

DESCRIPTION OF THE DRAWINGS

Exemplary embodiments of the method and system for efficient exception handling of the production process of personal identification verification (PIV) smartcards will be described in detail with reference to the following figures, in which like numerals refer to like elements, and wherein.

DETAILED DESCRIPTION

A method and system provide efficient exception handling of the production process of PIV smartcards. Specifically, an automatic personal identity verification (AutoPIV) system and process manage potential failures in identification for agencies, such as a breakdown in correct identification. The AutoPIV system and process may deny access to individuals falsely claiming to be someone with legitimate access rights. The AutoPIV system and process may also accurately identify those with legitimate access rights.

Figure 1A:
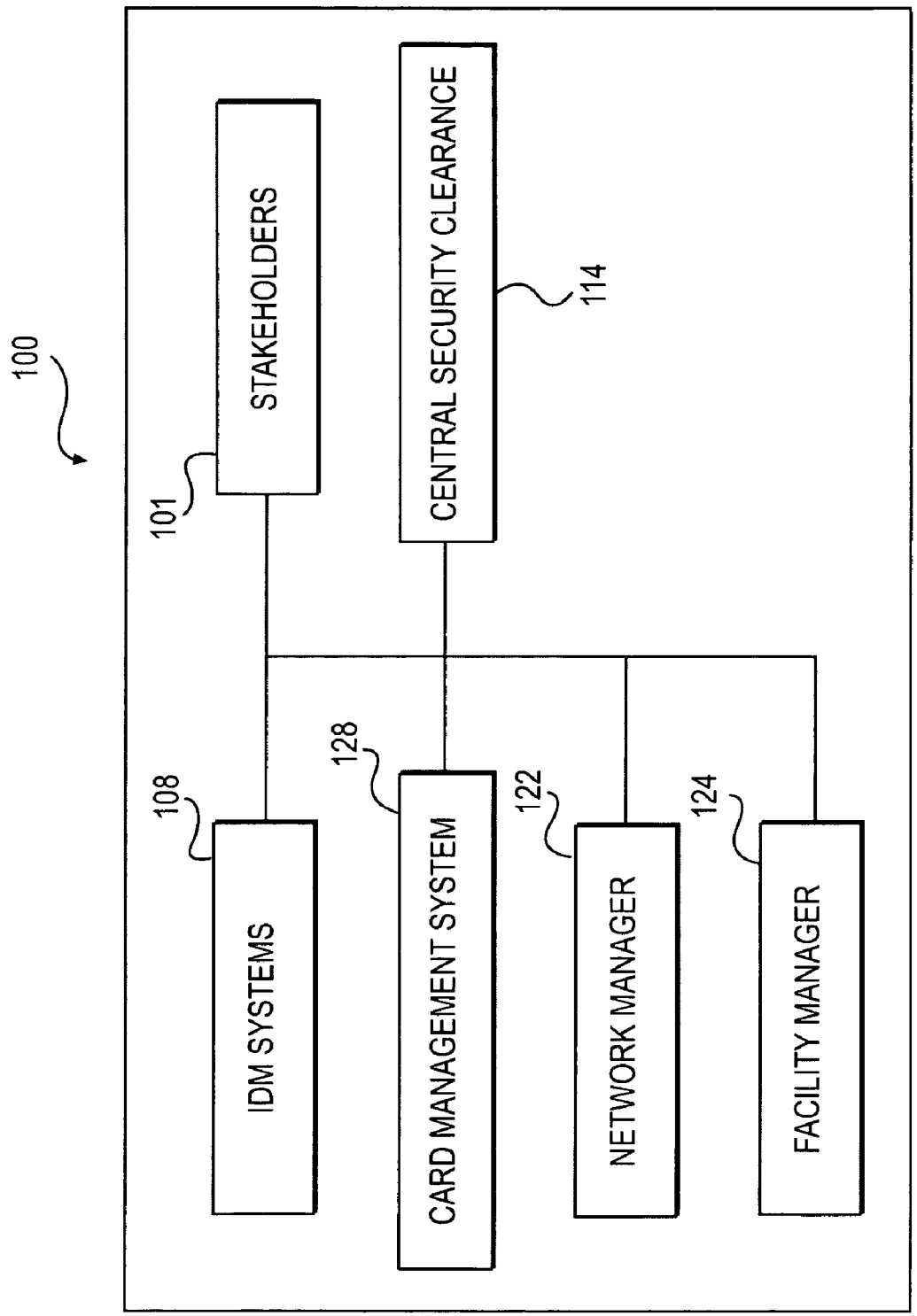
FIGS. 1A and 1B show an embodiment of an exemplary automatic personal identity verification (AutoPIV) system and process.
Figure 1B:
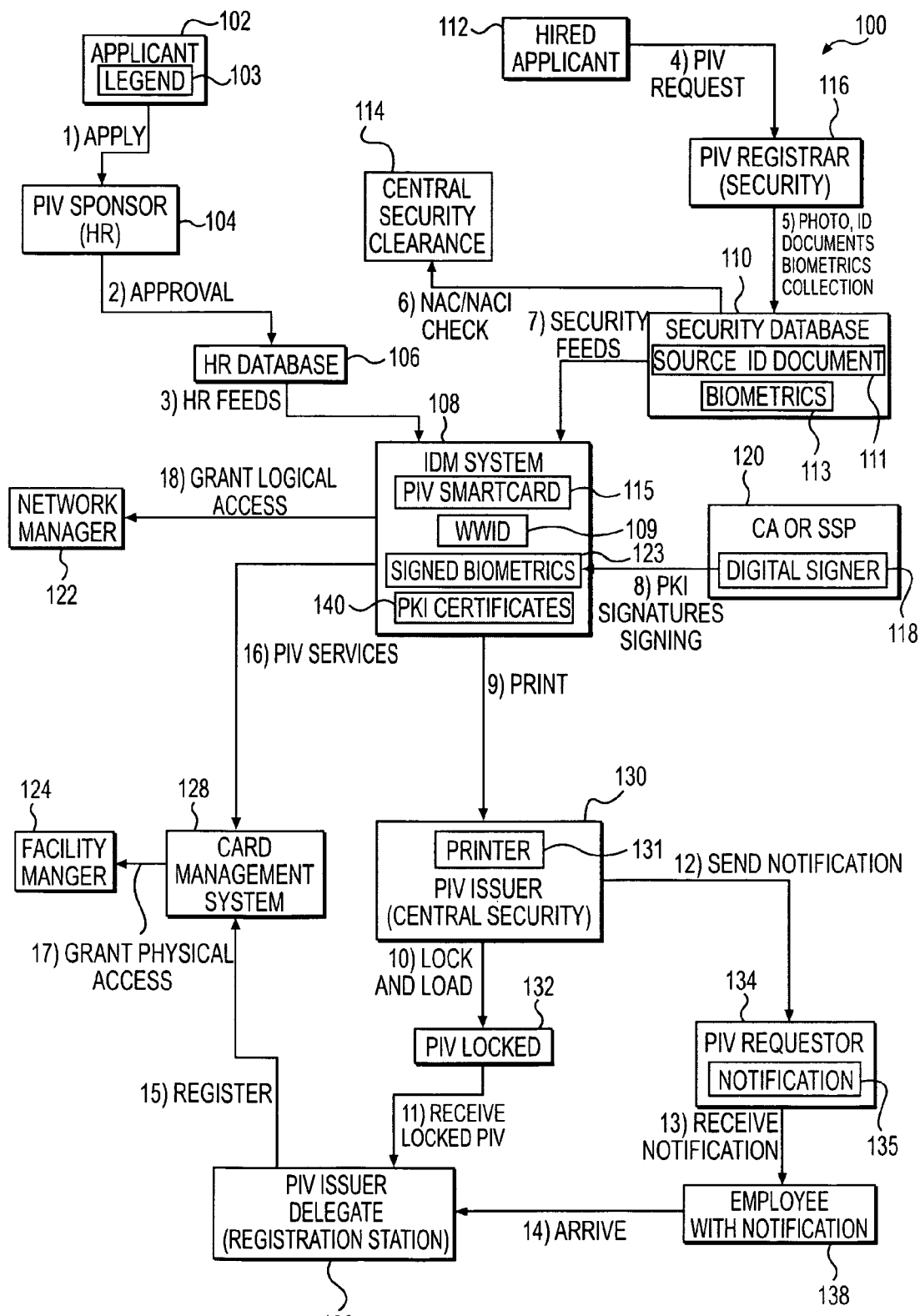

FIGS. 1A and 1B show an embodiment of an exemplary AutoPIV system 100 and process. Referring to FIG. 1A, the exemplary AutoPIV system 100 may include various stakeholders 101, a central security clearance 114, an identity management (IDM) system 108, a card management system 128, a network manager 122, and a facility manager 124. Referring to FIG. 1B, the stakeholders 101 may include an applicant applying for a position or clearance, a personal identification verification (PIV) sponsor 104 that controls a human resources (HR) database 106, a PIV registrar (e.g., security agency) 116 that controls a security database 110, a PIV issuer 130, a central security clearance or external biometric vetting agency 114, and a PIV issuer delegate (e.g., PIV registration station) 136.

With continued reference to FIG. 1B, the applicant may include an applicant applying for a position 102, a hired applicant 112, or an employee with notification 138 (all shown in FIG. 1B), whose stake in the AutoPIV system 100 includes applying for employment, applying for a PIV smartcard, receiving notification of a new PIV smartcard, and arriving at their place of employment for the first time after receiving notification. Once a PIV smartcard is issued, facility and network access privileges may be granted at the discretion of those that control the privileges, such as the network manager 112 and the facility manager 124.

The PIV sponsor 104, such as the HR department in an organization, is responsible for hiring and terminating employees and contractors, as well as recording at which locations these employees and contractors work and live. Additional stakeholders include the PIV registrar 116, the PIV issuer 130, and the PIV issuer delegate 136. These stakeholder roles are typically reserved for various parts of the security organization. These stakeholders may record and validate documents, collect biometrics, coordinate biometric uniqueness testing, issue PIV smartcards, distribute the PIV smartcards to places of employment, and notify the person receiving a PIV smartcard where to obtain the card. The PIV issuer delegate 136 may also operate the front-end of a card management system 128 and may enable appropriate physical accesses.

Information technology (IT) stakeholders in an IT group (not shown) are responsible for numerous database feeds, maintenance of the identity management subsystem, issuing and revoking the underlying digital credentials of a PIV smartcard and managing the PIV smartcard. The IT group is responsible for enabling and disabling network access, and determining when an employee or contractor meets all the requirements to start the PIV smartcard issuance process. The IDM system 108 communicates, via a network 318 (shown in FIG. 3), with the various stakeholders 101 in the AutoPIV system 100 to provide efficient exception handling of the production process of PIV smartcards.

With continued reference to FIG. 1B, the flow arrows indicate exemplary actions taken by the stakeholders in the AutoPIV system 100, such as steps 1-18 as shown in FIG. 1B. For example, steps 1, 4, 13, and 14 may be performed by the applicant 102 the hired applicant 112, or the employee with notification 138. Step 2 may be performed by the PIV sponsor 104. Steps 5, 6, 9, 10, 11, 12, 15, and 17 may be performed by the PIV registrar 116, the PIV issuer 130, and the PIV issuer delegate 136. Steps 3, 7, 8, 16, and 18 may be performed by the IT stakeholders. Details of the exemplary eighteen steps of the AutoPIV system 100 and method shown are provided as follows.

An "Applicant" 102 may apply, in step 1, for the right to join a sponsoring agency or organization. The responsible organization typically has a HR department acting as the PIV sponsor 104 that can accept applications.

Most HR departments have existing policies for determining if the "Applicant" 102 is to be hired, in step 2. Specifically, the "Applicant" 102 may present a "legend" 103, thus claiming to be a specific Applicant. A typical "legend" 103 includes employment, education, and criminal and credit histories. The HR department makes a determination if the specific "Applicant" 102 has suitable characteristics and if a need exists for this set of characteristics. The FIPS-201 standard lays out specific minimum requirements to identity-proof the existence of a real "legend" 103. Eventually, the "Applicant" 102 may be approved for hire and be submitted to the existing HR database 106, thus becoming a "Hired Applicant" 112.

A HR feed process, step 3, may allow for existing, disjoint HR databases 106 to be combined to form the basis of the IDM system 108. During the process of entering a new "Hired Applicant," a World-Wide Identity (WWID) 109 may be created in the IDM system 108. When a new "Hired Applicant" 112 is entered into the local HR database 106, a default WWID 109 may be empty. In the case of an organization transfer, an existing WWID 109 may override the empty WWID 109. In an exemplary embodiment data may be synchronized between the local HR database 106 and the IDM system 108. During the synchronization of data, an empty WWID 109 may be detected, and a new WWID 109 may be created in the IDM system 108 by using the next available unused value. As part of the synchronization, the new WWID 109 may then be fed back to the local HR database 106, thus setting the WWID 109 in the local HR database 106 automatically. The WWID 109 may then serve as the primary index for future database synchronization. Thus the AutoPIV system 100 may create for each new person a unique WWID 109 during the feed process. Since most organizations are amalgamations of earlier organizations, the WWID 109 may provide a life-long unique ID within the confines of the organization. This process is implemented, for example, in Northrop Grumman's TRW Enterprise Directory System (TEDS) public key infrastructure (PKI) system. This process is also implemented in the Johnson & Johnson PKI system.

The PIV registrar 116 may request for PIV information in step 4. Once the HR department 104 has determined that a person is to be hired, the FIPS-201 standard requires that identity source documents 111 and biometrics 113 be collected. The identity source documents 111 may include acceptable documents defined in, for example, Form I-9, OMB No. 1115-0136, and Employment Eligibility Verification. One of such source identity documents 111 may be a valid State or Federal government-issued picture identification. The "Hired Applicant" 112, with an HR vetted specific identity and WWID 109, may present him or herself to a designated site where identity source documents 111 are to be presented and verified. This is a standard process specified in the FIPS-201 standard. The FIPS-201 standard does not specifically require a security agency. However, the security departments in most organizations typically have specific collection equipments for collecting biometrics 113.

The PIV registrar may collect, in step 5, source identity documents 111 and biometrics 113. Source identity documents 111 of an applicant may be presented, verified and scanned at a PIV registrar (e.g., security agency) 116. Biometrics 113, such as ten-print finger biometrics, may be collected. Once collected, these biometrics 113 and source identity documents 111 may be stored in a security database 110. Although ten-print fingering is illustrated here as an example, one skilled in the art will appreciate that other strong biometrics 113 suitable for the verification of identity can be substituted if allowed by policy.

A central security clearance (e.g., external biometrics vetting agency) 114 may check biometrics 113 in step 6. In accordance with the FIPS-201 standard, a FBI criminal check, otherwise known as a National Agency Check (NAC), may be conducted. A National Agency Check with written Inquiries (NACI) may be submitted, but a PIV smartcard is typically issued based on a successful NAC. For example, if a NACI does not clear within six months, an issued PIV smartcard 115 may be revoked. One skilled in the art will appreciate that other existing, verified security clearance may replace the NAC/NACI process. For example, an organization operating outside the strict requirements of FIPS-201, such as a state Department of Motor Vehicles (DMV), may provide an alternate one-to-many verification process.

The security information is fed into the IDM system 108 in step 7. Since an organizational identity has been created in step 3 and indexed by a WWID 109 in the IDM system 108, the IDM system 108 may be easily and securely populated with the scanned source identity documents 111, audit trail information, and the biometrics 113 collected during step 5.

The IDM system 108 may obtain PKI signatures in step 8. The FIPS-201 standard requires separate vetting of the legends 103, the source identity documents 111, and the biometrics 113. The AutoPIV system 100 and process meet this requirement by providing certifications independently, separated by time and space. A PIV smartcard 115 may be issued when all the vetting is complete. The AutoPIV process may start the subsequent steps in an automatic fashion when this certification is detected by, for example, the IDM system 108. Once the need for a PIV smartcard is detected, e.g., all FIPS-201 requirements have been satisfied, the IDM system 108 acts as an automatic registration authority (RA), and orders, for example, a subordinate PKI certification authority (CA) 120 to issue all the keys and certificates required by the FIPS-201 standard and local policy. A card holder unique ID (CHUID), such as the WWID 109, and the biometrics 113 may be signed with a digital signer 118, such as an RFC 3852 digital signer. PKI certificates 140 may be issued by the CA 120. The CA 120 may be local or remote. The IDM system 108 may also use a shared service provider (SSP) 120 if the federal agency is required to use an SSP by policy. An SSP is a CA vendor whose processes have been approved by the Federal PKI Bridge, and whose root certificate authority has been signed by the bridge root CA. Typically, an SSP establishes a unique CA for each agency that they support. For example, all new Federal PKIs established after Dec. 31, 2005 are required by OMB to use an SSP.

The AutoPIV system 100 may use a central PIV smartcard printer 131 under the control of the PIV issuer 130 to issue the PIV smartcards 115, in step 9. Many smartcards, driver's licenses, credit cards, and other tokens may be issued centrally. However, these tokens are typically reputable since there is no chain of custody and the tokens may be intercepted and used by someone other than the intended user. The AutoPIV system 100 issues non-reputable PIV smartcards 115 from one or more centralized locations and uses the security mechanism described in step 10, thus saving costs associated with decentralized printing without compromising security.

The AutoPIV system 100 may lock the PIV smartcard 115, in step 10, during the printing and PKI key-loading production process in a secured facility. Standard-based non-reputable PIV smartcards 115 may use a personal identification number (PIN) to release the keys and biometrics 113 on the PIV smartcard 115. Only the person represented by the PIV smartcard 115 is allowed to know the PIN. The AutoPIV system 100 sets the "Locked" status 132 of the PIV smartcard 115 during the printing and key-loading production process to provide a highly secure environment. This locked state 132 may be, for example, a card state that occurs if a user enters the PIN incorrectly too many times. When locked, the PIV smartcard 115 is merely a plastic card without any functionality. In an exemplary embodiment, this "locked state by user error" is a requirement of the PIV smartcard 115. Once intentionally locked during the production phase, the PIV smartcard 115 becomes an inert plastic token and is safe for distribution through postal or other public channels, while preserving non-reputability.

Once a PIV smartcard 115 is printed and rendered locked and useless in step 10, the PIV smartcard 115 may be sent, in step 11, to the PIV issuer delegate 136 using public distribution channels. The destination may be set by the PIV sponsor 104 that manages the location of critical distribution locations stored in the IDM system 108 for employees or contractors. Distribution of the PIV smartcard 115 outside the direct control of the person receiving the PIV smartcard 115 provides additional security and convenience. Specifically, the PIV smartcard 115, while in a locked state, may be sent to a PIV issuer delegate 136 at the normal place of employment, such as the ingress location for new employees, to await the arrival of an "Employee/Contractor with Notification" 138. The act of issuing a PIV smartcard 115 may convert a "Hired Applicant" 112 into an actual employee or contractor, since at that point the person has cleared all the necessary hurdles for access to the physical and logical aspects of that employment.

The PIV issuer 131 may print a notification 135 of where to pick up the new PIV smartcard 115 and send, in step 12, the notification 135 to the PIV requestor 134. For new employees, this notification 135 may also serve as a notice that the "Hired Applicant" 112 has transitioned to an "Employee/Contractor with Notification" 138, having passed the FBI criminal check and document verifications, and that a PIV smartcard 115 is waiting to be picked up. Persons that already have an expiring PIV smartcard 115, or who have lost a PIV smartcard 115 may also receive a similar notification 135, so that they know when and where to pick up the replacement.

An employee or contractor receives, in step 13, the notification 135 of the new PIV smartcard issuance through email or paper mail, specifying the location at which the PIV smartcard 115 can be picked up. Once the notification 135 is received, the employee or contractor may become, for example, an "Employee/Contractor with Notification" 138. With the AutoPIV system 100, reissuance for an event, such as meeting new PIV identity proofing requirements, may occur securely at a central point, with millions of PIV smartcards 115 being issued in days, not years, because millions of people are not required to present themselves at specialized secure facilities for a lengthy process. Generally, people are directed to pick up their PIV smartcards 115 at the facility where they work every day. In the case of new employees or contractors, the initial PIV smartcard 115 may be picked up, for example, at the site of initial ingress or training, all at the discretion of the PIV sponsor 104 at HR.

Once an "Employee/Contractor with Notification" 138 receives his or her new PIV smartcard notification 135, he or she may report to a "PIV Registration" station 136 specified by their notification 135 to pick up the PIV smartcard 115, in step 14. The FIPS-201 standard requires the establishment of "PIV Registration" stations 136 at all physical facilities. This is typically used, in accordance with the FIPS-201 standard, to register a PIV smartcard 115 for local physical and logical access at the discretion of the local site. Under the AutoPIV system 100, the PIV registration station 136 required by the FIPS-201 standard may assume additional responsibilities as a PIV issuer delegate 136. The PIV registration station 136 may be authorized to distribute new PIV smartcards 115 to persons bearing a notification 135, after collection of an electronic signature, photo, and fingerprints, and after IDM verification of the biometrics 113. The PIV issuer delegate 136 may digitally sign each request for the audit trail, and may present an appropriate set of biometrics 113 and signatures with each issuance. In an embodiment, failure to present an appropriate biometric set may lead to an investigation and may cause cancellation of the PIV smartcard 115. The PIV smartcard 115 typically cannot be unlocked without the concurrence of the IDM system 108, which evaluates the submitted biometrics 113 before making an informed decision.

Registration is a standard requirement of the FIPS-201 standard. The PIV issuer delegate 136 may register, in step 15, the PIV smartcard 115 with the card management system 128. During registration, the PIV smartcard 115 may be detected as an "owned" PIV smartcard 115, thus allowing the PIV registration station 136 to manage owned PIV smartcards. By supplying AutoPIV card management functions at every building of an organization, the AutoPIV system 100 manages all exceptions in a trusted and cost efficient way. Specific card management functions are described below, all of which require biometric verification of the identity of the person by the IDM system 108.

The IDM system 108 may provide, in step 16, PIV services using the card management system 128. Signed biometrics 123 may be required to be on the PIV smartcard 115 for use at external agency sites. The IDM system 108 (or equivalent card printing system) may have a copy of the biometrics 113 to issue or reissue the PIV smartcard 115. By using the user's biometrics 113 that are stored on the IDM system 108 to complete the chain of trust, the AutoPIV system 100 provides a biometrically assured method of card management without the need to fully trust the PIV registration station 136 or operator.

PIV smartcards 115 can be controlled using symmetric or asymmetric card management systems 128 supplied by various vendors. The real issue is when the PIV smartcard 115 SHOULD be managed, and to ensure that the PIV smartcard owner is present. The AutoPIV system 100 may ensure that the PIV smartcard owner is present by using PKI and biometrics 113. Assurance may be supplied by the strong fingerprint biometrics 113 held by the IDM system 108. PKI may assure the presence of a certified PIV registration operator, which may be ascertained using the PIV registration station operator's PIV smartcard. Card management functions will be describes in more detail later.

The card management system 128 may grant, in step 17, physical access. The FIPS-201 standard requires that if a local facility wants a person to have physical access the facility management may use the PIV smartcard 115 to validate identity, and then may enable the PIV smartcard 115 for access in the local physical security system. With the AutoPIV system 100, granting of physical access may occur after the identification of the individual and his or her PIV smartcard 115, and after a local facility manager 124 determines that access granting is appropriate. The process of granting access may be a locally determined process.

The IDM system 108 may grant, in step 18, logical access. The FIPS-201 standard requires logical access. The IDM system 108 may provide a centralized place to enable the network for logical access using the PIV smartcard user's keys. Granting of logical access may occur after the identification of the individual and his or her PIV smartcard 115, and after a network manager 122 determines that access granting is appropriate. The process of granting logical access may be a locally determined process. The AutoPIV system 100 may set the access mode to smartcard sign-on. If the PIV smartcard 115 is forgotten by an individual, the AutoPIV system 100 may change to the access mode to user identification (ID) and password sign-on or may enable a temporary logical access PIV smartcard 115.

The following illustrates exemplary card management functions that may be implemented in connection with the method and system for efficient exception handling of the production process of PIV smartcards.

As described above, PIV smartcards 115 arrive at a PIV registration station 136 in a locked state 132 in accordance with step 11. The "Employee/Contractor with Notification" 138 presents the notification 135 allowing the PIV issuer delegate 136 to locate the PIV smartcard 115. The person may be photographed, fingerprinted, and then may sign out the PIV smartcard 115 by personally signing the electronic signature device. The person may be asked to enter a new PIN, so that the PIN is known only to him or her. The new PIN may be encrypted by card management 128 and sent to the IDM system 108. The card management system 128 may be a subsystem of IDM system 108. The card management system 128 may first check for a valid PIV smartcard 115, then for a valid biometrics 113 taken from the "Employee/Contractor with Notification" 138 and may finally check for a valid operator as verified by the operator's PIV smartcard. This AutoPIV system 100 may allow the IDM system 108 to encode the PIN submitted by the "Employee/Contractor with Notification" 138, and to securely unlock the PIV smartcard 115 and set the PIN remotely. The IDM system 108 may then delete its knowledge of the PIN. PIV smartcard users may modify the PIN at their desktop to provide additional security as needed.

The AutoPIV system 100 may unlock a PIV smartcard 115 that has been accidentally locked. The PIV smartcard user may go to nearest PIV registration station 136 (usually at the entrance to their building) and the locked state 132 may be detected. The PIV smartcard user may have his or her fingerprint, photo, signature, and a new PIN collected at the PIV registration station 136. This information may be digitally signed by the PIV registration station operator, and the data may be forwarded to the card management system 128 of the IDM system 108, which then unlocks the user's PIV smartcard 115, after checking the biometric 113. After the PIV smartcard 115 is unlocked, a new PIN may be set.

Employees may forget their badges. The AutoPIV system 100 simplifies the process for handling this anomaly. The employee or contractor that forgets his or her badge may arrive at an organization facility and identify himself or herself by name or employee number. The PIV issuer delegate 136 may submit a request to the IDM system 108, accompanied by the employee's fingerprint, photo and signature. The IDM system 108 (after biometric verification) may revert the user's network status from smartcard log-on to user ID and password log-on for logical access. Alternatively, the IDM system 108 may allow the enablement of a temporary logical access smartcard and may provide for a temporary physical access card to be issued and enabled.

Lost badges are a major inconvenience for most badging or PKI systems. With the AutoPIV system 100, a user with a lost PIV smartcard 115 may present himself and declare a lost PIV smartcard 115. In accordance with the FIPS-201 standard, a new photo, index fingerprints, and signature may be collected and sent to the IDM system 108 to provide the same level of checking that occurs in the case of a forgotten PIV smartcard 115, and the user may be granted temporary logical and physical access. The IDM system 108 may also notify the PKI CA 120 to revoke all PKI certificates 140 associated with the lost PIV smartcard 115. The IDM system 108 may also reissue the PIV smartcard 115. This issuance may happen immediately at the central printing facility 131, which locks and loads the new PIV smartcard 115 using the process described above. As part of this process, updated photos and index fingerprints are available and may be digitally signed. The PIV smartcard 115 is mailed in accordance with the AutoPIV process. The next time the user with a lost PIV smartcard 115 arrives at work, a new PIV smartcard 115 may be distributed and unlocked.

The AutoPIV system 100 and process may establish a secure and economical method for certificate renewal. The IDM system 108 may detect that renewal is required when it is time to issue a replacement PIV smartcard 115. The IDM system 108 may verify that an employee or contractor has not left the organization (as testified by the HR feeds in step 3), and has not been added to a watch list (as testified by the security feeds in step 7). The IDM system 108 may send a notification 135 to the employee or contractor instructing him or her to stop at the PIV issuer delegate 136 at his or her normal place of employment, or at the closest location to his or her employment. The PIV issuer delegate 136 may collect the new photograph and two new index fingerprints. The AutoPIV system 100 may then issue a replacement PIV smartcard 115, with new certificates and keys. The PIV smartcard 115 may be locked and mailed in accordance with the AutoPIV process. When the "Employee/Contractor with Notification" 138 has received the notification 135, he or she may report to the PIV issuer delegate 136, and may receive and unlock his or her PIV smartcard 115. The existence of an old user PIV smartcard 115 may be detected by the IDM system 108 during the PIV smartcard activation process, which immediately causes the CA 120 to revoke the old PKI certificates 140. The process of activating the new PIV smartcard 115 terminates the old PIV smartcard 115. Each replacement PIV smartcard 115 may be activated in locked step with the disablement of the previous PIV smartcard 115, with no overlap or underlap.

Cancelled and stolen PIV smartcards 115 may be detected in accordance with the FIPS-201 standard by the IDM system 108. In the event that a fingerprint collection is not possible due to a known disability registered with the IDM system 108, the IDM system 108 may revert to facial or other biometrics 113 as allowed by policy. This is the secondary biometric process for all card management functions.

The AutoPIV system 100 utilizes the existing or FIPS-augmented HR and security functions, provides biometric vetting by external agencies, centralized printing, and PIV registration and integrated card management functions. As a result, the AutoPIV system 100 and process may significantly reduce the deployment cost of the FIPS-201 standard. The AutoPIV system 100 utilizes multiple independent locations, e.g., PIV sponsor (e.g., HR) 104, PIV registrar (e.g., security agency) 116, central security clearance (e.g., NAC/NACI) 114, PIV issuer 130, and PIV issuer delegate (e.g., PIV registration station) 136. By using existing agency functionality in multiple locations, no additional manpower is required. Biometrics 113 provide the underlying assurance of both identity and privilege.

Figure 2:
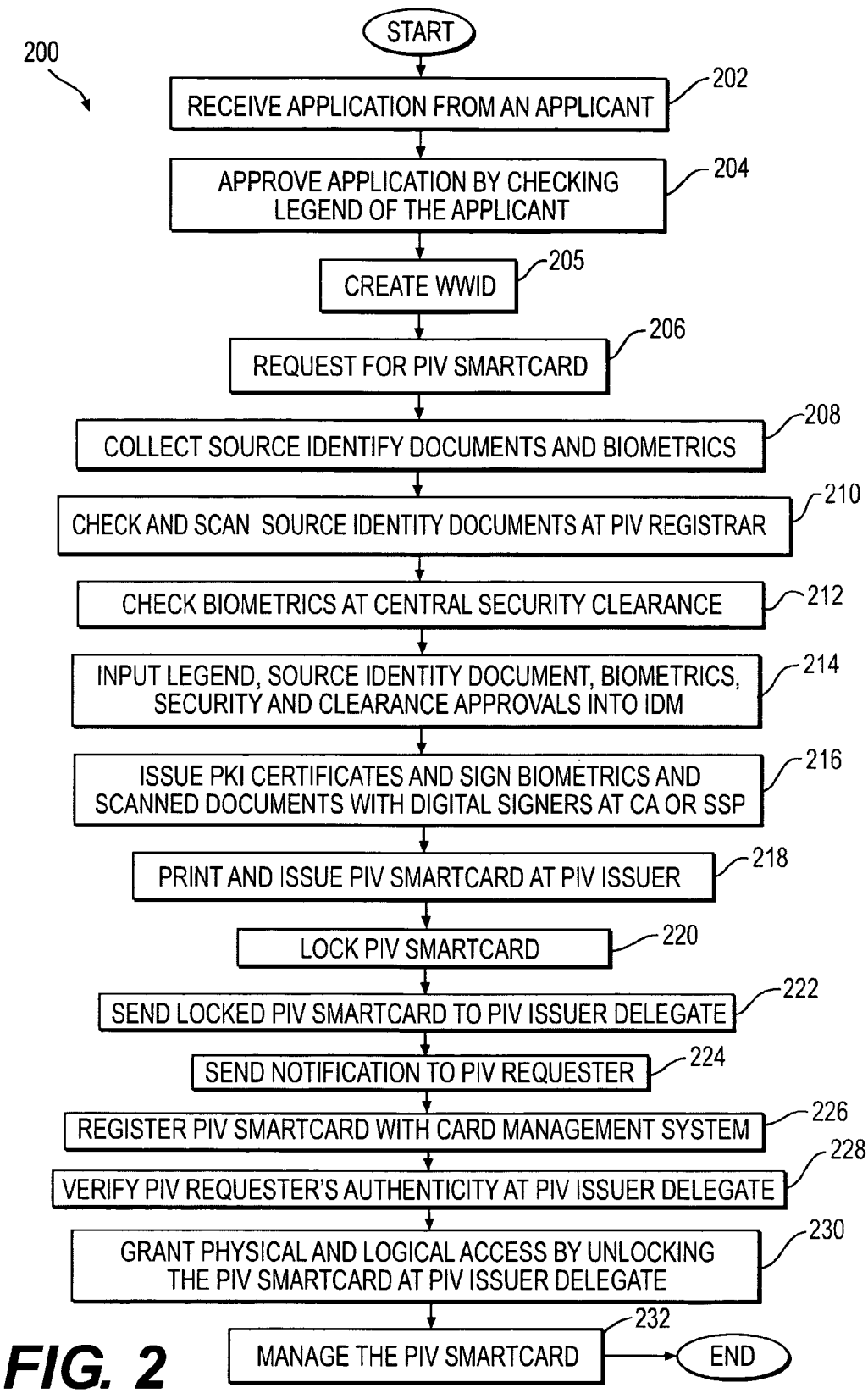
FIG. 2 is a flow chart illustrating an embodiment of an exemplary method for efficient exception handling of the production process of PIV smartcards.

FIG. 2 is a flow chart illustrating an embodiment of an exemplary method 200 for efficient exception handling of the production process of PIV smartcards. The AutoPIV system 100 receives an application from an Applicant (block 202), approves the application using the PIV sponsor (e.g., HR) 104 to check the legend 103 of the Applicant 102 (block 204), creates a WWID 109 (block 205), and requests a PIV smartcard 115 (block 206). An employee or contractor that loses or forgets his or her PIV smartcard 115 may also request a replacement PIV smartcard 115. The AutoPIV system 100 collects source identity documents 111 and biometrics 113 from the "Applicant" 102 (block 208) and uses the PIV registrar (e.g., security agency) 116 to check and scan the source identity documents 111 (block 210). The AutoPIV system 100 further uses the central security clearance (e.g., NAC/NACI) 114 to check the biometrics 113 (block 212). The legend 103, the HR approval, the source identity documents 111 and biometrics 113, and the security and clearance approvals are input into the IDM system 108 (block 214).

Next, the AutoPIV system 100 uses the local CA or SSP 120 to issue required PKI certificates 140 and to sign the biometrics 113 with the digital signer 118 (block 216), and prints and issues the PIV smartcard 115 at the PIV issuer (e.g. central security) 130 (block 218). The PIV smartcard 115 may be issued automatically when the clearance and other requirements are met. Any CA can issue the required PKI certificates 140 and any RFC 3852 signer can be used to sign the biometrics 113. The AutoPIV system 100 locks the PIV smartcard 115 during the printing and PKI key-loading production process (block 220) and sends the locked PIV smartcard 115 to the PIV issuer delegate (e.g., PIV registration station) 136 (block 222), which later enables and manages the PIV smartcard 115. Card management is enforced by signed biometrics 113 and signature and is not at the discretion of the operator alone. Cameras, index finger readers, and electronic signature collectors may be used to support the PIV smartcard issuance and reissuance at the PIV issuer delegate 136. The IDM system 108 sends notification 135 to the PIV requester 134 (block 224). The AutoPIV system 100 registers the PIV smartcard 115 with the card management system 128 (block 226). The AutoPIV system 100 verifies the PIV requester's authenticity at the PIV issuer delegate 136 (block 228), grants physical and logical access by unlocking the PIV smartcard at the PIV issuer delegate 136 (block 230), and manages the PIV smartcard 115 (block 232).

The AutoPIV system 100 and process require no special training of the end user. When an individual applies for a job, his or her source identity documents are checked, he or she may be fingerprinted at the PIV registrar 116 and may subsequently receive a mailed notification 135 to pick up his or her badge. He or she may show up at work and receive his or her PIV smartcard 115. He or she may set their PIN using their fingerprint or other approved biometrics 113 as proof of being present. A PIV smartcard user may correct anomalies in his or her PIV smartcard status by showing up at the PIV registration station 136 with his or her fingerprints or face or other approved biometrics as in the case of Section 508 disabilities.

Figure 3:
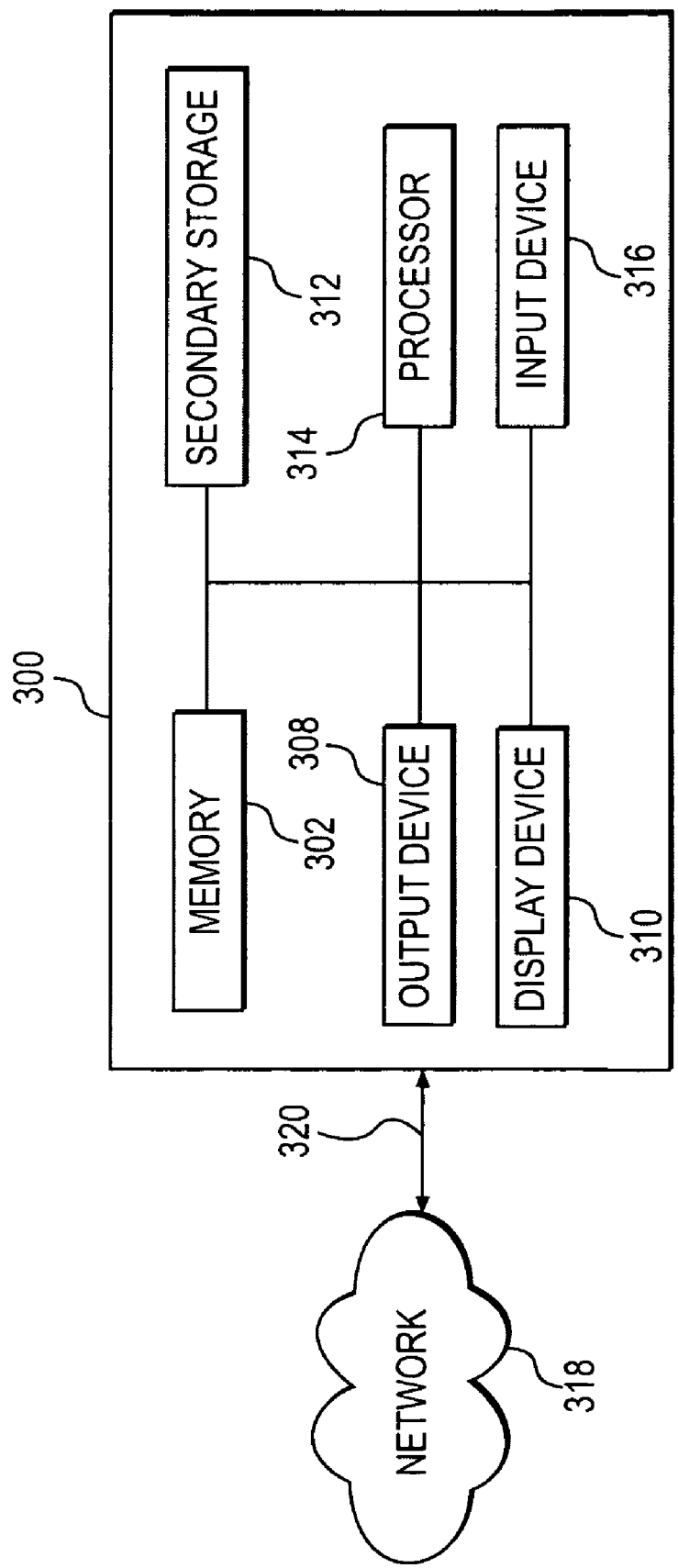
FIG. 3 illustrates exemplary hardware components of a computer that may be used in connection with the exemplary method for efficient exception handling of the production process of PIV smartcards.

FIG. 3 illustrates exemplary hardware components of a computer 300 that may be used in connection with the exemplary method for efficient exception handling of the production process of PIV smartcards. The computer 300 may be located in the IDM 108 and may include a connection 320 with a network 318 such as the Internet or other type of computer or telephone network. For example, the network 318 connects the IDM 108 with the PIV sponsor 104, the PIV registrar 116, the card management system 128, the PIV issuer 130, the PIV issuer delegate 136, the network manager 122, and the facility manager 124 to facilitate the transmission of data and information. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the method for efficient exception handling of the production process of PIV smartcards are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the method and system for efficient exception handling of the production process of PIV smartcards have been described in connection with an exemplary embodiment, those skilled in the art will understand that many modifications in light of these teachings are possible, and this application is intended to cover variations thereof.

What is claimed is:

1. A method for efficient exception handling of the production process of personal identification verification (PIV) smartcards, comprising:
   receiving an applicant legend from a PIV sponsor;
   checking the applicant a legend submitted by a PIV sponsor;
   collecting source identity documents and biometrics of the applicant;
   verifying the authenticity of the source identity documents and biometrics of the applicant prior to issuing a PIV smartcard at least once through a PIV registrar and at least once through a central security clearance;
   checking the biometrics by conducting a criminal background check on the applicant prior to issuing a PIV smartcard;
   inputting the legend, the source identity documents, the biometrics, and security and clearance approvals into an identity management (IDM) system;
   printing and issuing a PIV smartcard, that contains the biometrics of the applicant;
   locking the PIV smartcard, wherein the PIV smartcard is locked after issuance;
   verifying the applicant's authenticity upon receiving the applicant's request for access to security systems, including collecting a second biometrics for the applicant at a registration station; and
   granting the applicant physical and logical access to the security systems by unlocking the PIV smartcard, wherein the PIV smartcard is unlocked after clearing with the IDM system by:
      using a personal identification number (PIN) to release the biometrics on the PIV smartcard; and
      using the IDM system to evaluate the second collected biometrics by comparing the second collected biometrics with the biometrics on the PIV smartcard.

2. The method of claim 1, further comprising issuing private key infrastructure (PKI) certificates and signing the biometrics and the scanned documents with digital signers.

3. The method of claim 1, further comprising registering the PIV smartcard with a card management system.

4. The method of claim 1, further comprising creating a World-Wide Identity (WWID) for the applicant.

5. The method of claim 1, further comprising managing the PIV smartcard using the IDM system.

6. The method of claim 1, wherein the checking the biometrics step includes conducting a National Agency Check (NAC).

7. The method of claim 1, wherein the checking the biometrics step includes conducting a National Agency Check with written Inquiries (NACI).

8. The method of claim 1, wherein the verifying the applicant's authenticity step is conducted at a PIV registration station.

9. The method of claim 1, further comprising changing an access mode from smartcard sign-on to user identification (ID) and password sign-on if the applicant forgets the PIV smartcard.

10. The method of claim 1, further comprising issuing a temporary PIV smartcard if the applicant forgets the PIV smartcard.

11. A system for efficient exception handling of the production process of personal identification verification (PIV) smartcards, comprising:

a central security clearance that checks biometrics of an applicant requesting access to security systems, wherein the central security clearance checks the biometrics of the applicant by conducting a criminal background check on the applicant;

an identity management (IDM) system, the IDM system collecting a legend of an applicant from a PIV sponsor and collecting source identity documents and the biometrics of the applicant from a PIV registrar, wherein the PIV registrar verifies the authenticity of the source identity documents and biometrics of the applicant, wherein the IDM communicates with the central security clearance to obtain security and clearance approvals regarding the applicant; and a network connecting the central security clearance and the IDM system, wherein the IDM system issues a PIV smartcard for the applicant after obtaining the security and clearance approvals from the central security clearance, wherein the PIV smartcard contains the biometrics of the applicant, wherein the PIV smartcard is locked after issuance, wherein the IDM system, after verifying the applicant's authenticity at a registration station including collecting a second biometrics of the applicant, grants the applicant physical and logical access to the security systems by unlocking the PIV smartcard, wherein the PIV smartcard is unlocked after clearing with the IDM system by using a personal identification number (PIN) to release the biometrics on the PIV smartcard, and using the IDM system to evaluate the second collected biometrics by comparing the second collected biometrics with the biometrics on the PIV smartcard, and wherein the IDM system communicates with the registration station using the network.

12. The system of claim 11, wherein the IDM system uses a certification authority (CA) to issue private key infrastructure (PKI) certificates and to sign the biometrics and the source identity documents with digital signers.

13. The system of claim 11, wherein the IDM system uses a shared service provider (SSP) to sign the biometrics and the source identity documents with digital signers.

14. The system of claim 11, wherein the central security clearance checks the biometrics by conducting a National Agency Check (NAC).

15. The system of claim 11, wherein the central security clearance checks the biometrics by conducting a National Agency Check with written Inquiries (NACI).

16. The system of claim 11, wherein the IDM system sends a notification to the applicant to pick up the PIV smartcard.

17. The system of claim 11, wherein the IDM system registers the PIV smartcard with a card management system.

18. The system of claim 11, wherein the IDM system creates a World-Wide Identity (WWID) for the applicant.

19. The system of claim 11, further comprising a security database for storing the biometrics and the source identity documents.

20. A non-transitory computer readable medium providing instructions stored on the non-transitory computer readable medium for efficient exception handling of the production process of personal identification verification (PIV) smartcards, the instructions comprising:

receiving an applicant legend from a PIV sponsor;

checking the applicant a legend submitted by a PIV sponsor;

collecting source identity documents and biometrics of the applicant;

verifying the authenticity of the source identity documents and biometrics of the applicant prior to issuing a PIV smartcard at least once through a PIV registrar and at least once through a central security clearance;

checking the biometrics by conducting a criminal background check on the applicant prior to issuing a PIV smartcard;

inputting the legend, the source identity documents, the biometrics, and security and clearance approvals into an identity management (IDM) system;

printing and issuing a PIV smartcard, that contains the biometrics of the applicant;

locking the PIV smartcard, wherein the PIV smartcard is locked after issuance;

verifying the applicant's authenticity upon receiving the applicant's request for access to security systems, including collecting a second biometrics for the applicant at a registration station; and granting the applicant physical and logical access to the security systems by unlocking the PIV smartcard, wherein the PIV smartcard is unlocked after clearing with the IDM system by:

using a personal identification number (PIN) to release the biometrics on the PIV smartcard; and using the IDM system to evaluate the second collected biometrics by comparing the second collected biometrics with the biometrics on the PIV smartcard.

21. The computer readable medium of claim 20, further comprising instructions for registering the PIV smartcard with a card management system.

22. The computer readable medium of claim 20, further comprising instructions for creating a World-Wide Identity (WWID) for the applicant.

23. The computer readable medium of claim 20, further comprising instructions for changing an access mode from smartcard sign-on to user identification (ID) and password sign-on if the applicant forgets the PIV smartcard.

* * * * *